United States Patent [19]
Achmad

[11] Patent Number: 6,152,271
[45] Date of Patent: Nov. 28, 2000

[54] SHOCK ABSORBER MOUNTED ELECTROMAGNETICALLY OPERATED DAMPER VALVE

[75] Inventor: Muchlis Achmad, Santa Clarita, Calif.

[73] Assignee: HR Textron, Inc., Valencia, Calif.

[21] Appl. No.: 09/122,532

[22] Filed: Jul. 24, 1998

Related U.S. Application Data

[63] Continuation-in-part of application No. 08/909,750, Aug. 12, 1997.

[51] Int. Cl.[7] .................................................... F16F 9/34
[52] U.S. Cl. ..................................... 188/266.5; 188/319.1
[58] Field of Search ........................... 188/266.5, 322.5, 188/299.1, 319.1

[56] References Cited

U.S. PATENT DOCUMENTS

| | | | |
|---|---|---|---|
| 4,785,920 | 11/1988 | Knecht et al. ........................ | 188/299 |
| 4,905,798 | 3/1990 | Engelsdorf et al. .................... | 188/299 |
| 5,027,927 | 7/1991 | Bacardit .............................. | 188/299 |
| 5,293,970 | 3/1994 | Schneider et al. ..................... | 188/299 |
| 5,454,452 | 10/1995 | Ohlin ................................. | 188/299 |
| 5,657,840 | 8/1997 | Lizell ................................ | 188/299 |
| 5,690,195 | 11/1997 | Kruckemeyer et al. ................. | 188/299 |

*Primary Examiner*—Michael Mar
*Assistant Examiner*—Bradley King
*Attorney, Agent, or Firm*—Fulbright & Jaworski L.L.P.

[57] ABSTRACT

A shock absorber mounted electromagnetically operated damper valve which is mounted upon a piston rod and provides a flow path for fluid which bypasses the piston which separates a cylinder of the shock absorber into a pair of fluid containing chambers. The damper valve includes a spool reciprocally mounted within the hollow interior of a housing. A retainer is also received within the hollow interior and includes a restricted orifice which produces a differential pressure across the spool to assist in retaining the spool in a predetermined position in the absence of electromagnetic signal.

4 Claims, 9 Drawing Sheets

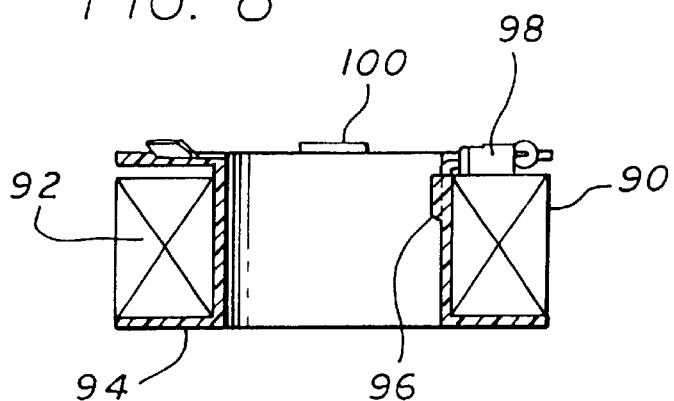
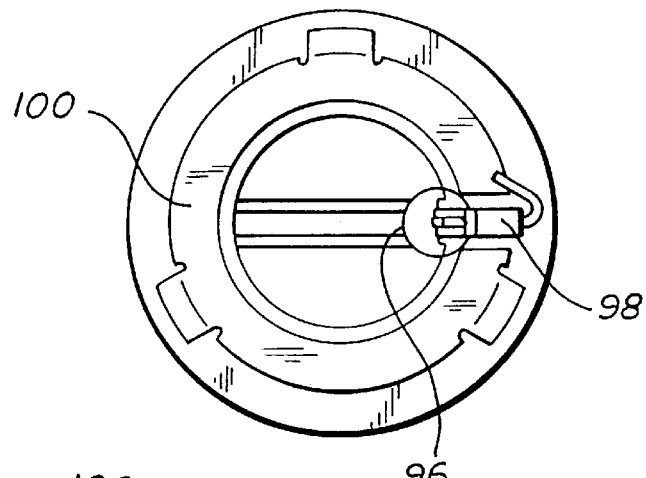
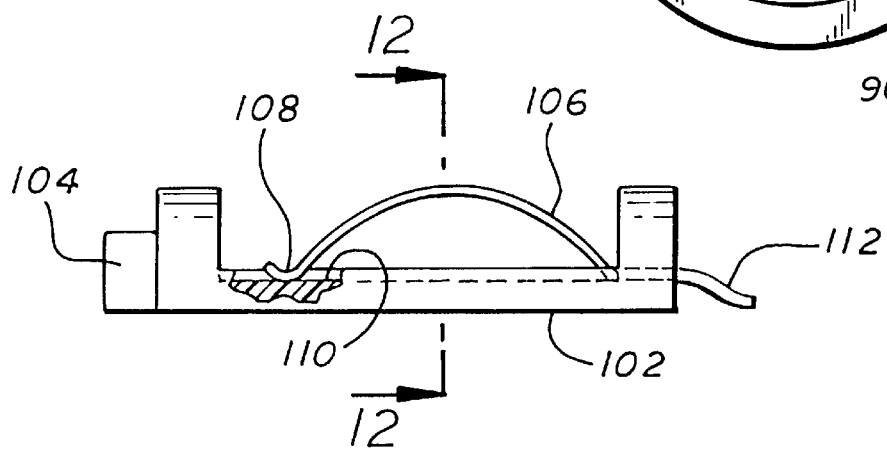
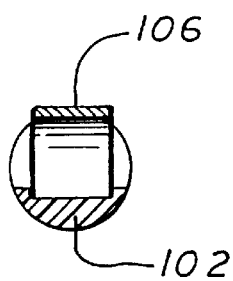
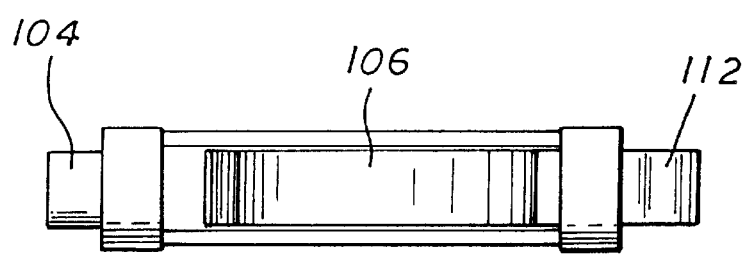

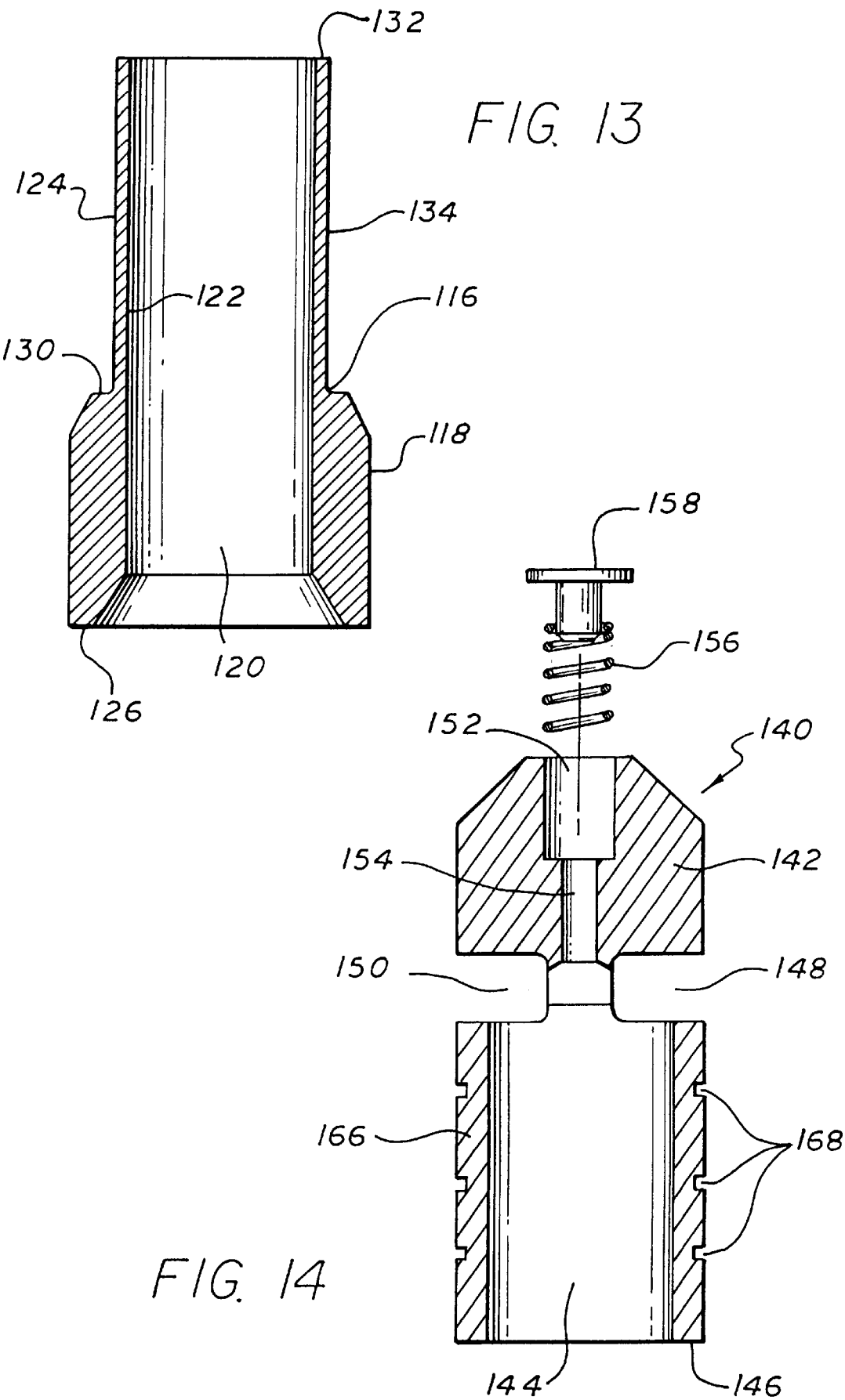

SHOCK ABSORBER MOUNTED ELECTROMAGNETICALLY OPERATED DAMPER VALVE

RELATED APPLICATION

This application is a continuation-in-part application of Ser. No. 08/909,750 filed Aug. 12, 1997 by Muchlis Achmad and assigned to H.R. Textron, Inc. of Valencia, Calif., U.S.A.

BACKGROUND OF THE INVENTION

The present invention relates to shock absorbers for use in automotive vehicles and more particularly to vibration dampers of the type which are mounted upon the shock absorber and are electromagnetically actuated to damp vibrations.

Such shock absorbers are traditionally constructed by having a damping piston which is fastened to a piston rod which divides the work cylinder into two chamber halves filled with a hydraulic damping fluid. The piston typically incorporates valves for restricting the flow of fluid therethrough as the piston moves along the cylinder. The valves are designed to provide a greater resistance in one direction of the piston movement than the other. These valves are usually preset during manufacture and the setting of these valves is not suitable for all vehicle load conditions generated by surfaces over which the vehicle may be driven and/or the speeds at which the vehicle may be driven.

To accommodate varying loads, road surfaces, driving conditions and the like, shock absorbers have been produced with adjustable piston valves and/or with additional controlled valves as a part thereof. These valves for the most part have been adjustable externally of the shock absorber either manually or electro-mechanically. In some instances, electromagnetically operated damping valves have been included to accommodate this additional adjustable feature. Typical of such, prior art adjustable hydraulic vibration dampers included within shock absorbers are the devices disclosed in U.S. Pat. Nos. 4,638,896; 5,559,700; 5,409,089; 4,723,640; 4,785,920; 4,854,429.

SUMMARY OF THE INVENTION

A shock absorber mounted electromagnetically operated damper valve for regulating the flow of fluid through the shock absorber to accommodate varying road conditions which damper valve includes a housing defining a plurality of openings. A spool means is reciprocally mounted within a hollow interior of the housing and is moveable between first and second positions responsive to electromagnetic energization thereof. A retainer means is provided within the hollow interior of the housing for maintaining the spool means in a predetermined position.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 8 is a side view partially in cross-section of a coil assembly used as part of the valve of the present invention;

FIG. 9 is a top elevational view of the coil assembly shown in FIG. 8;

FIG. 10 is a side view partially in cross-section showing a contact assembly of the valve of the present invention;

FIG. 11 is a top view thereof;

FIG. 12 is a cross-sectional view taken about the lines 12—12 of FIG. 10 thereof;

FIG. 13 is a cross-sectional view of a retainer of the present invention;

FIG. 14 is a cross-sectional view of the spool used in the present invention;

DETAILED DESCRIPTION OF PREFERRED EMBODIMENTS OF THE INVENTION

Figure 1:
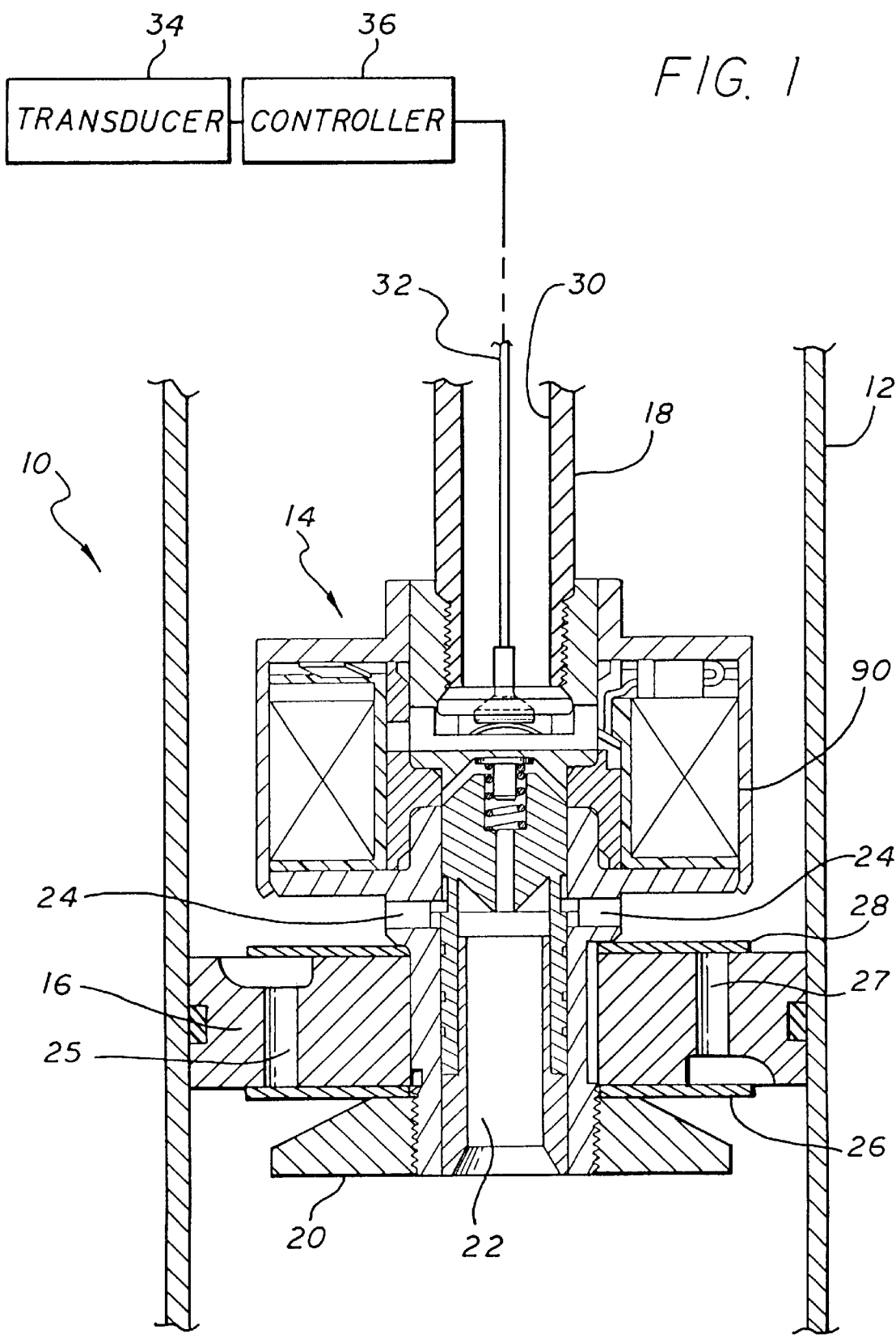
FIG. 1 is a cross-sectional view of part of a telescopic shock absorber incorporating an electromagnetically operated damper valve constructed according to the principles of the present invention.

As is illustrated in FIG. 1, an electromagnetically actuated damper valve constructed in accordance with the principles of the present invention is shown in FIG. 1 assembled as part of a typical shock absorber. This typical shock absorber includes a cylinder 12 having a piston 16 mounted on a piston rod 18 with the damper valve 14 interposed between the piston rod 18 and the piston 16.

In a typical automotive vehicle configuration, the vehicle body is supported by four wheels and by four suspensions including springs of known types. Each of the suspensions also include a shock absorber mounted in a conventional shock absorber configuration as above-generally described. Each corner of the vehicle would also include means for detecting linear position between the vehicle wheel and the suspended vehicle body at that corner of the vehicle. The sensor or transducer may be constructed utilizing any of the well known devices available in the industry capable of sensing such position and providing an output signal. The output signals generated by the transducers are then used to control the damping valve which is mounted within the shock absorber. Such structures as generally described above are well known in the art. For example, as illustrated in U.S. Pat. No. 5,559,770 ('770) above-referenced which is incorporated by reference herein and therefor no further detailed description of the overall system is provided. What is illustrated and discussed hereafter in this application is the construction of the electromagnetic actuated damper valve mounted as an integral part of each shock absorber at each corner of the vehicle.

As is shown in FIG. 1, the damper valve 14 is connected to the lower end of the piston rod 18. The damper valve includes a lower portion upon which the piston 16 is mounted. The piston 16 is held in place by a retaining nut 20. The lower end of the damper valve 14 defines a longitudinal inlet opening 22 through which fluid mounted within the cylinder may flow. The fluid will pass through the opening 22 and out outlet openings 24 laterally disposed within the damper valve 14. In accordance with the illustration of FIG. 1, the damper valve 14 is normally open thus providing a bypass flow of the fluid normally contained within the cylinder 12 on each side of the piston 16. Additional flow is provided through the piston 16 through the longitudinal openings 25 and 27 provided therein. The openings 25 and 27 are blocked by closure members 26 and 28 respectively. As is well known to those skill in the art, as the piston 16 is caused to move upwardly as viewed in FIG. 1, the fluid flows through the opening 25 and is restrained by the closure member 26 until sufficient force or differential pressure occurs across the piston 16 to cause the closure member 26 to open thereby allowing fluid to flow through the opening 25. Similarly, as the piston is moved downwardly, fluid is allowed to flow through the opening 27 after the differential pressure across the piston exceeds a predetermined amount established by the closure member 28. It will be understood by those skilled in the art that relatively slow movement of the piston 16 within the cylinder 12 will allow fluid to flow in an unrestricted manner through the openings 22 and 24 thereby bypassing the openings 25 and 27 in the piston 16. However, upon very rapid movement of the piston within the cylinder 12 the area provided by the opening 22 and the openings 24 will be insufficient to permit unrestricted flow of the fluid and a differential pressure will build across the piston 16 thereby bringing into play the flow through the openings 25 and 27 as above-described. Thus it is seen there are parallel flow paths for the fluid in the cylinder 12 on each side of the piston 16 depending upon the operating conditions encountered by the suspension on a particular corner of the vehicle.

Depending upon the operating conditions encountered by a particular corner of the vehicle, it may be desired to stiffen the shock absorber at a particular corner of the vehicle. This would be accomplished by utilizing the signal generated at that particular corner by the position sensor or transducer 34 associated therewith. The signal generated by the transducer would be applied to a controller 36 which traditionally would be a microprocessor which would function in accordance with a pre-determined algorithm to provide an output signal over the wire 32 which is positioned within an opening 30 in the piston rod 18 and is connected as will be described more fully below to electromagnetically energize the damper valve 14. When such occurs the openings 24 are closed thus permitting fluid to flow only through the openings 25 and 27 within the piston 16.

Figure 2:
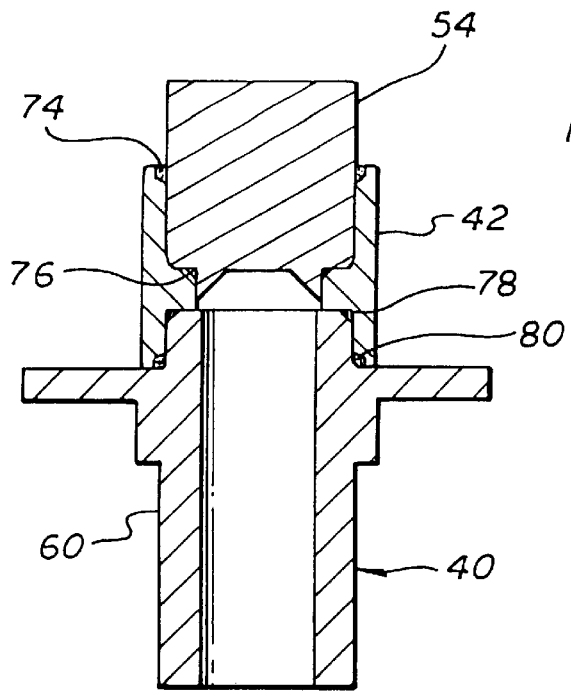
FIG. 2 is a cross-sectional view of an intermediate housing subassembly of the valve of the present invention prior to final machining thereof.
Figure 3:
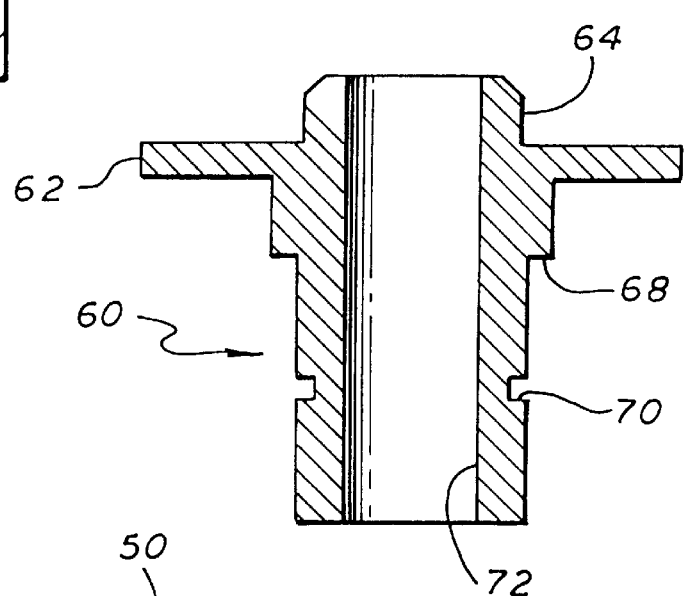
FIG. 3 is a cross-sectional view of the housing portion of the subassembly of FIG. 2.
Figure 4:
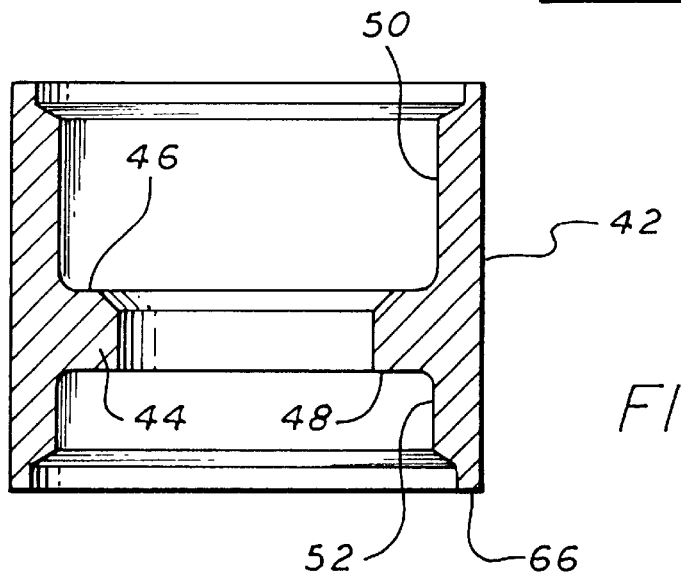
FIG. 4 is a cross-sectional view of a spacer which is part of the subassembly of FIG. 2.
Figure 5:
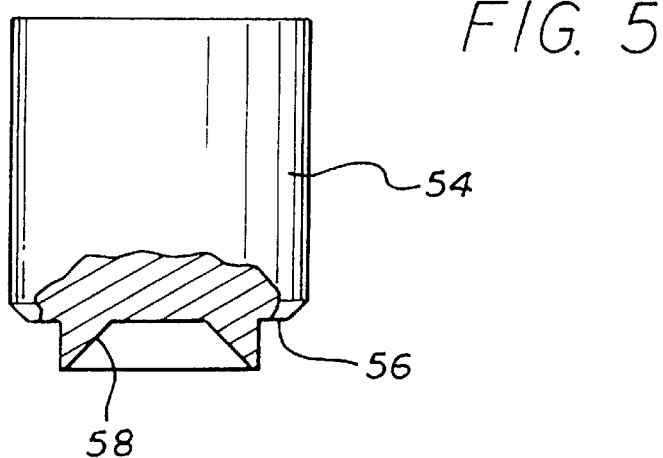
FIG. 5 is a partial cross-sectional view of a center pole of the subassembly of FIG. 2.

Referring now, more particularly to FIGS. 2 through 5, there is illustrated an intermediate housing subassembly of the valve including the component parts thereof which are assembled to provide this subassembly. The subassembly is illustrated in cross-section in FIG. 2. The subassembly of FIG. 2 is constructed by providing a non-magnetic material spacer 42 which includes an inwardly directed radial flange 44 defining shoulders 46 and 48. The flange 44 divides a bore 50 from a bore 52. A center pole piece 54 is inserted into the bore 50 until a shoulder 56 engages the shoulder 46 formed on top of the flange 44. The outer diameter of the pole piece 54 conforms to substantially the same as the inner diameter of the bore 50. The lower portion of the pole piece 54 is formed as a truncated conical surface 58 and will be described more fully in operation below. A housing member 60 having a radially outwardly directed flange 62 includes an upper protrusion 64 which is received within the bore 52 of the spacer 42. The inner-upper portion of the flange 62 abuts a lower edge 66 of the spacer 42. The housing member defines a shoulder 68 and a groove 70 on the lower portion thereof below the flange 62. The housing member also defines a bore 72 therethrough having a diameter which is substantially the same as the diameter of the inwardly directed flange 44 of the spacer 42.

As is more clearly illustrated in FIG. 2, the center pole piece 54 is inserted into the bore 50 of the spacer 42 while the housing member 60 is disposed within the bore 52 of the spacer 42. Appropriate brazing material in the form of braze pre-forms are inserted at 74, 76, 78 and 80 as the subassembly is being assembled. Thereafter, the subassembly as shown in FIG. 2 with the brazed pre-forms in place is subjected to appropriate brazing temperatures for a time sufficient to braze the spacer, pole member and housing member together to form the subassembly as shown in FIG. 2. This brazing step secures the various portions of the housing subassembly together permanently so there can be no rotational and/or translational movement therebetween.

After the subassembly as shown in FIG. 2 has been brazed to permanently secure the members together, the subassembly is then machined to provide a completed housing member constructed in accordance with the principles of the present invention. The completed machined housing member is shown in FIG. 6 and FIG. 7 to which reference is hereby made.

Figure 6:
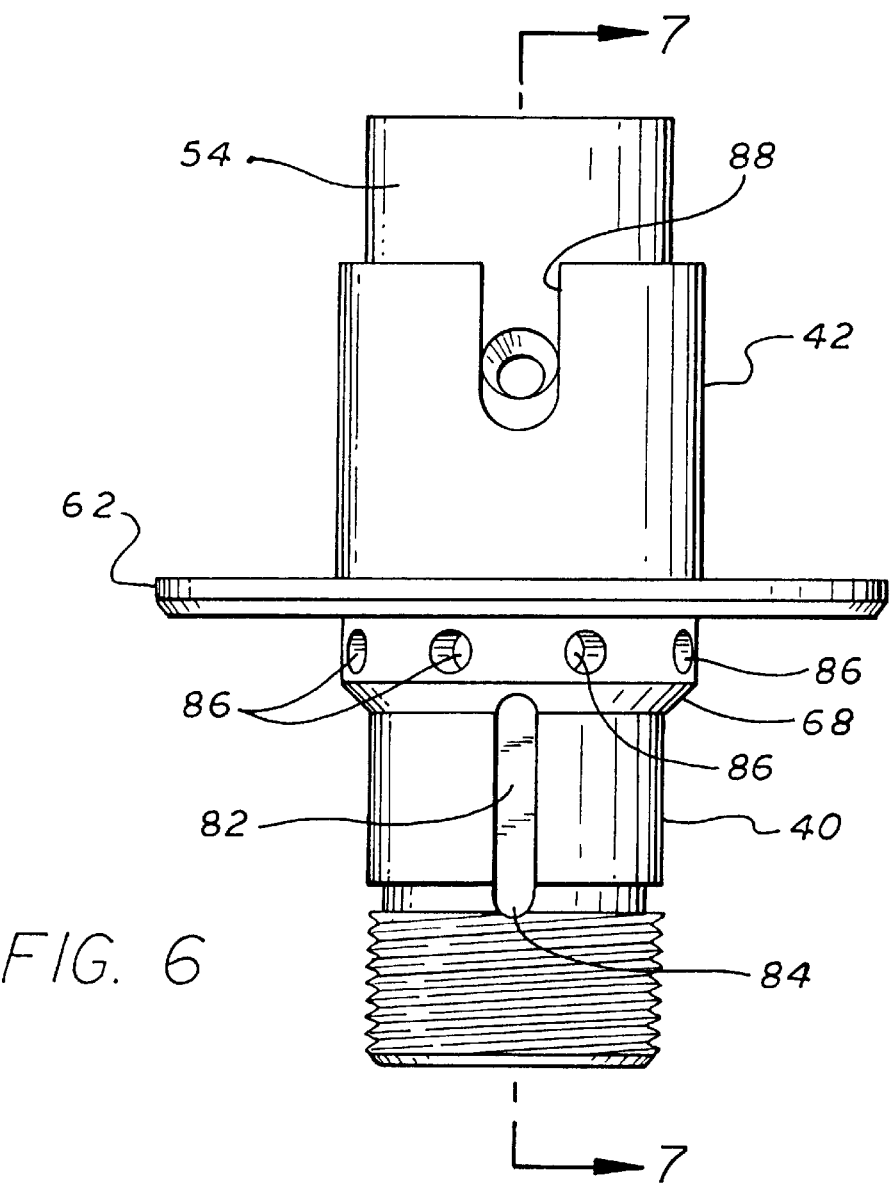
FIG. 6 is a side view of the subassembly of FIG. 2 after final machining thereof.

As shown in FIG. 6, the housing member 40 has been machined to provide a key way 82 which receives a key which is defined by the piston 16 to hold the piston in position and to prevent it from rotating upon the housing member 40. Prior to placing the piston 16 in place, the closure member 28 would be placed over the lower portion of the housing member so that it abuts the shoulder portion 68 which has now been tapered by the machining. Subsequently, the closure member 26 is placed on the lower side of the piston and the nut 20 is secured in place upon the threads 84 which are also formed at the bottom of the housing member 40. The housing member 40 also has formed therein a plurality of openings 86 between the shoulder 68 and the flange 62. The openings 86 provide the flow path 24 above-described in conjunction with FIG. 1. The spacer member 42 has been machined to provide a key way 88 which receives a key provided on the inner portion of the coil 90 which provides the electromagnetic flux to operate the valve. This structure will be discussed in further detail below.

Figure 7:
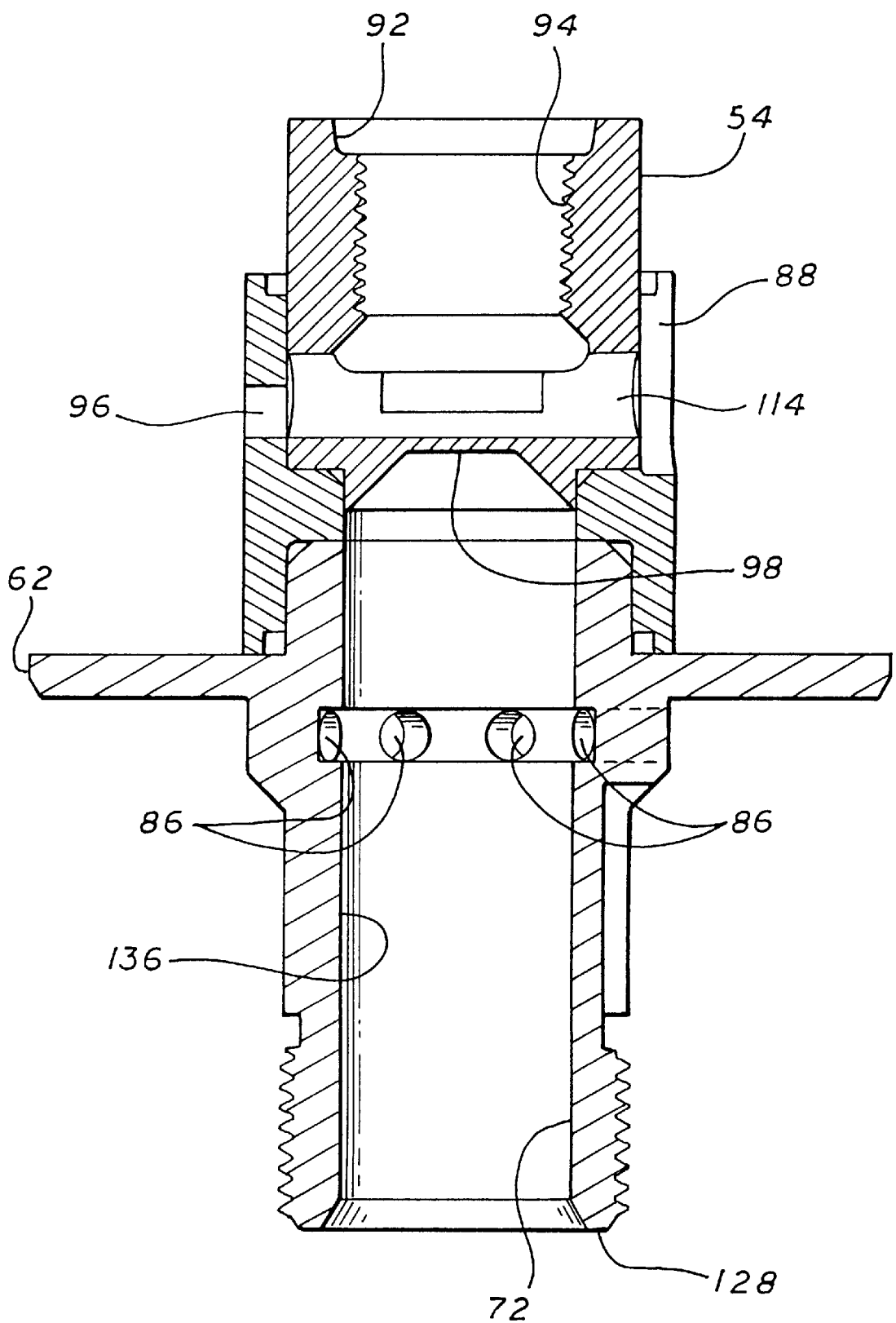
FIG. 7 is a cross-sectional view of the structure shown in FIG. 6 taken about the line 7—7 thereof.

As is more particularly shown in FIG. 7, the center pole member 54 has a bore 91 formed therein, the interior of which is threaded as shown at 94 to receive the piston rod 18. An opening 96 is formed transversely to the longitudinal axis through the center pole member and the spacer and receives a contact assembly as will be more fully described below in conjunction with FIGS. 10 through 12.

The bore 91 formed in the center pole member 54 terminates in a blind fashion leaving a lower wall 98 which blocks the flow of fluid causing it to flow through the openings 86.

Referring now to FIGS. 8 and 9, there is illustrated the coil assembly 90 which includes a wire-wound coil 92 placed upon an appropriate bobbin 94 which has been formed of insulating material. Appropriate contacts are formed for the positive and negative connections to the coil. An appropriate key 96 is formed on the inner portion of the bobbin as shown at 94 and is constructed through utilization of the portion of the plastic bobbin to which there is adhered the positive connection to the coil. An appropriate diode 98 is used to protect the controller 36 from electrical surges. Additional electrical connection 100 is formed on the top of the coil bobbin for providing the negative termination for the coil 90 as will be described more fully below.

By reference to FIGS. 10, 11 and 12, there is illustrated the contact assembly which provides electrical connection to the positive terminal of the coil 90. As is therein shown, there is provided a base 102 constructed of insulating material such for example as an appropriate molded plastic member. One end 104 of the base is provided with a non-circular configuration which may be inserted into the opening 96 and into engagement with flat portions thereof to preclude the base member 102 from rotation. Received within the base member is an electrical contact 106 which is in the form of a leaf spring-type configuration having a termination 108 in the form of a curved member to allow movement thereof along the bottom 110 of the base member when force is applied to the upper surface of the contact 106 by the end of piston rod 18 being screwed in place through utilization of threads 94. The bottom of the piston rod 18 has a center contact to which the wire 32 is connected and through which control signals from the controller 36 pass. The control signals are then conveyed through the electrical contact 106 and the end thereof shown at 112 which contacts the positive contact on the coil that is a part of the key 96. It will now be realized that the contact assembly as shown in FIGS. 10, 11 and 12 would be (upon assembly of the valve) inserted through the opening 114 provided inside the key way 88 of the spacer 42 with the end 112 of the electrical contact 106 extending into the key way 88. The opposite end 104 of the base 102 would be inserted into the opening 96 provided in the spacer 42 with the understanding that the opening 96 provides the flats which would cooperate with the non-round configuration of the protrusion 104 on the base 102 to prevent the contact assembly from rotating. Since the end 112 of the electrical contact protrudes into the key way 88, it is contacted by the electrical contact on the key 96 on the coil.

A retainer 116 which is illustrated in FIG. 13, is inserted into the opening or bore 72 provided at the lower end of the housing member 40. The full diameter as shown at 118 of the retainer 116 is substantially the same as the inner diameter of the bore 72 and the retainer 116 is press fitted into the bore 72 to retain the same in place. The retainer 116 includes a bore 120 defining an inner surface 122 which is smooth and extends along the entire length of the retainer 116. The retainer 116 defines a reduced diameter area resulting in a tubular extension as shown at 124. As will be appreciated by reference to FIGS. 7 and 13, when the retainer is press fitted in place with the end 126 thereof at substantially the same position as the end 128 of the housing member 40, the reduced diameter tubular portion 124 of the retainer 116 will define a space extending from the shoulder 130 to the end 132 between the outer surface 134 of the tubular member 124 and the inner surface 136 of the bore 72 in the housing member 40. The function of this space will be described in conjunction with FIG. 14 to which reference is hereby made.

Figure 15:
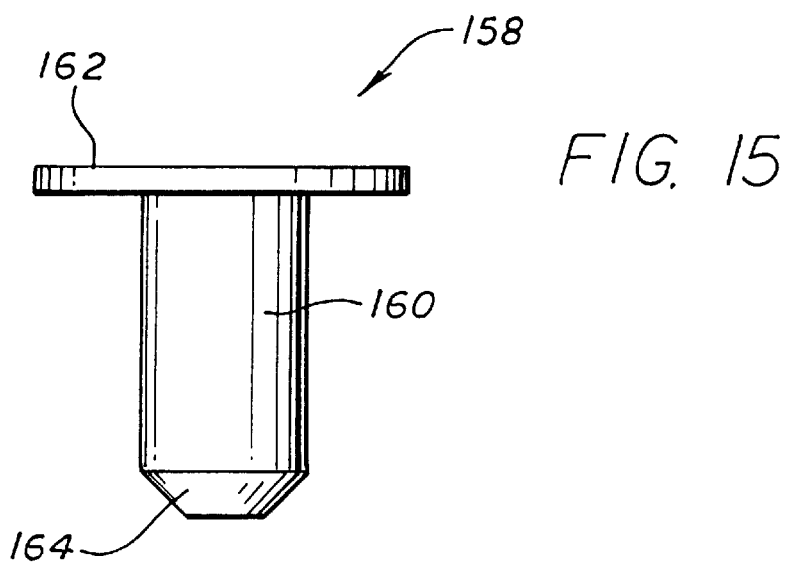
FIG. 15 is a side view of a shim used in the valve of the present invention.

As shown in FIG. 14, there is provided a spool 140 which is positioned within the housing and which is moveable between first and second positions depending upon whether an electrical signal is applied to the coil 90 of the valve. The sleeve includes a body 142 defining a bore 144 from the lower end 146 thereof. Slots 148 and 150 are provided on each side of the body 142 to provide a flow path as will be described below. The body 142 also defines an additional bore 152 at the opposite end from the bore 144. A reentrant bore 154 is also provided to permit fluid flow through the spool 140. A spring 156 is seated within the bore 152 and a shim 158 formed of a non-magnetic material is received within the spring 156. The shim 158 is more fully shown in FIG. 15 and includes a shim body 160 with a cap 162 thereacross. The lower end of the body 160 is tapered as shown at 164 to provide easy insertion of the shim into the end opening of spring 156. The bore 144 defines a skirt 166 on the spool 140. The skirt 166 has a width such that it will fit within the space between the surface 134 on the retainer and the surface 136 on the inner diameter of the bore 72 of the housing member 40. The outer surface of the skirt defines a plurality of grooves 168 to assist in the movement of the sleeve within the space between the retainer and the housing member as above described. The inner surface 122 of the retainer 116 provides a relatively long and smooth uninterrupted flow path for fluid which passes from the lower portion through the bore 72 and out through the openings 86 provided in the housing member and through the flow path 24 as described in conjunction with FIG. 1. This uninterrupted flow path provides less resistance and drag insofar as the spool 140 is concerned thereby allowing it to move vary rapidly with the application of less force than would otherwise be required to operate the valve.

Figure 16:
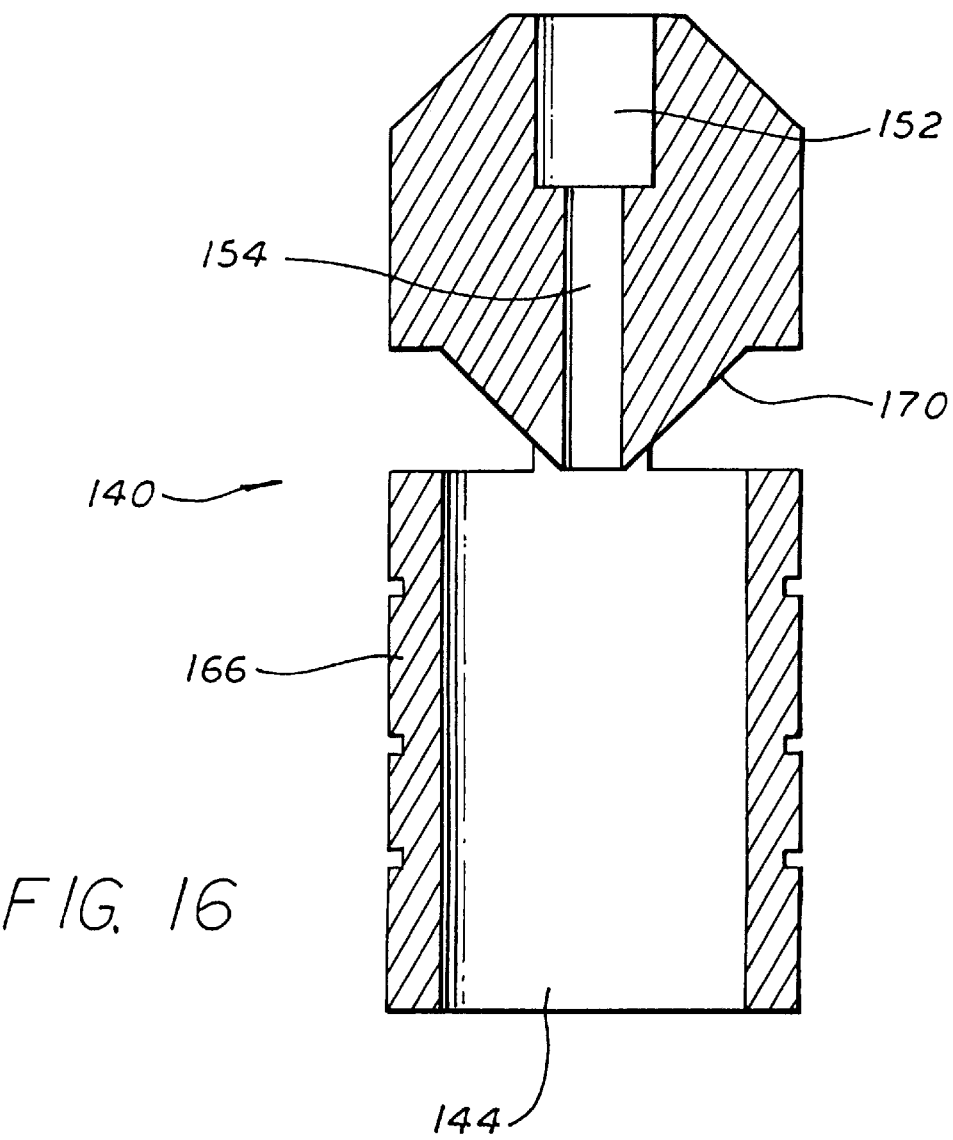
FIG. 16 is an alternative embodiment of a spool used in the valve of the present invention.

FIG. 16 shows an alternative arrangement of a spool. The spool as shown in FIG. 16 is substantially the same as the spool shown in FIG. 14 with the exception that an inclined surface is provided as shown at 170 to deflect the flow of fluid which flows from bottom to top of the spool as shown in FIGS. 14 and 16 and out through the openings 86 in the housing member 40. The construction of the spool as shown in FIG. 16 generates less force from fluid flow against the spool thereby enabling the utilization of a spring 56 which has less spring rate than is required to retain the spool as shown in FIG. 14 in its normally open quiescent position.

Figure 17:
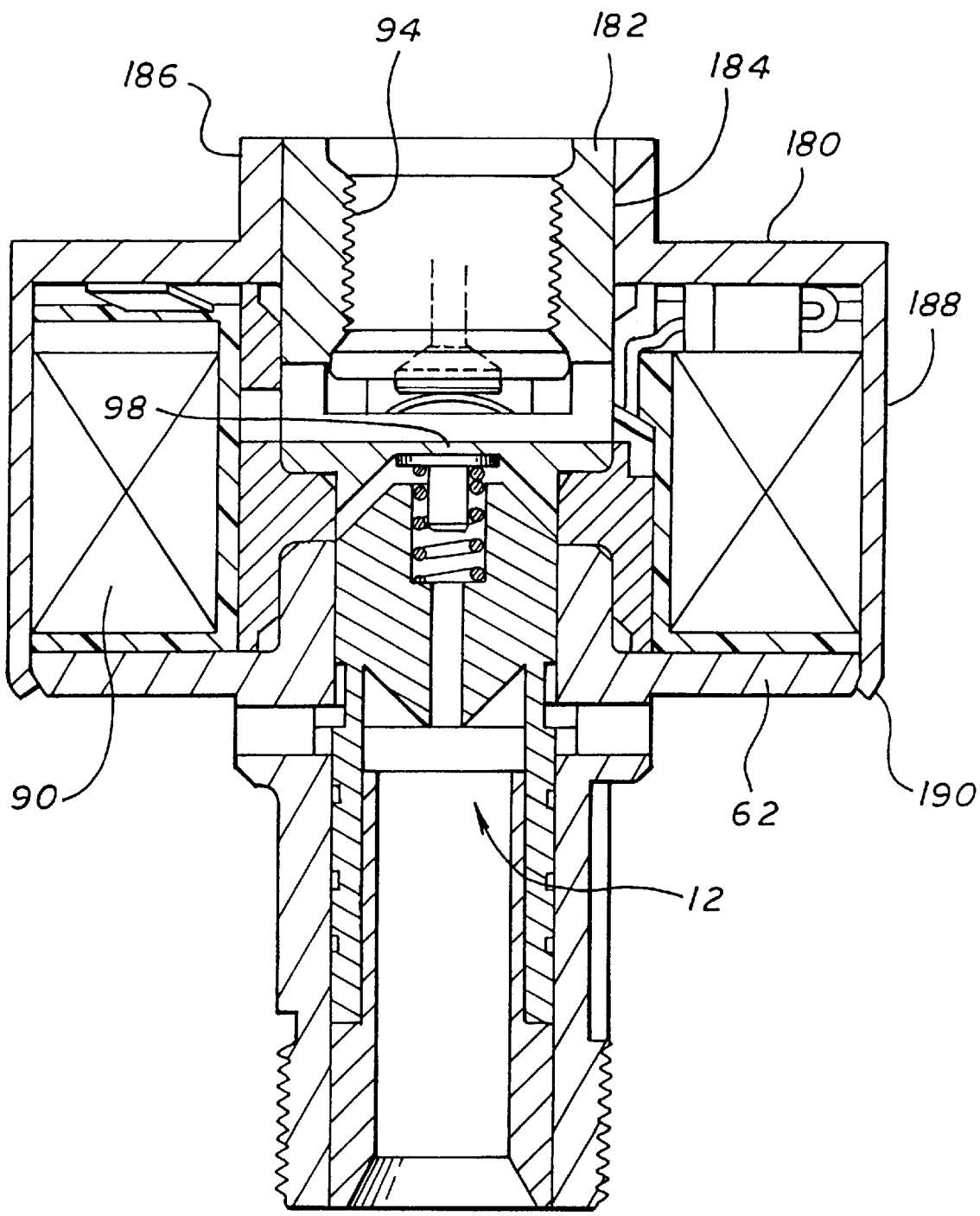
FIG. 17 is a cross-sectional of an assembled shock absorber mounted electromagnetically operated damper valve.

The damping valve fully constructed but before assembly upon the piston as shown in FIG. 1 is illustrated in cross-section in FIG. 17. The machined housing assembly is provided as above described. Thereafter, the sleeve of the embodiment as shown in FIG. 16 is positioned over the retainer tube 124 with the spring and shim in place. The entire assembly is then fitted into the bore 72 of the housing assembly with retainer tube lower portion being press fitted. The shim 158 provides a non-magnetic material between the top portion of the sleeve and the lower portion 98 of the center pole member to thereby provide a permanent air gap and prevent the spool from being retained by magnetic forces against the bottom of the center pole piece in the absence of a signal being applied to the coil 90. After such assembly, the coil assembly 90 is inserted in place by utilization of the key 96 and key way 88 as above described and positioned to rest upon the flange 62. Thereafter, a cap 180 is press fitted over the top 182 of the center pole member so that a seal is provided between the two engaging surfaces 184 between the outer surface of the center pole member and the inner diameter of the upper tubular member 186 of the cap 180. The lower barrel 188 of the cap 180 extends below the flange 62 and is swaged over as shown at 190 to provide a seal between the bottom of the barrel 188 and the flange 62. The two seals at 184 and at 190 along with the remaining portion 98 of the center pole member preclude the application of hydraulic fluid resident within the cylinder 12 to the coil 90.

It will now be appreciated that after assembly of the electromagnetically operated damper valve as above described and as shown in FIG. 17, it may be used with the assembly of shock absorbers placed in vehicles by threading the piston rod 18 into the threads 94 and by placing the piston 16 upon the lower portion of the housing member as above described and retaining in place with the nut 20. Alternatively, any shock absorber may be retrofitted in a similar manner after a system has been installed in the vehicle to utilize an appropriate transducer and controller as above discussed.

Through the utilization of the electromagnetically operated damper valve constructed in accordance with the principles of the present invention, when an event occurs which according to the program in the controller will provide an undesirable event for the user of the vehicle, a signal may be applied to the coil 90 energizing it and completing the magnetic circuit which will cause the spool to move from the position shown at 17 which is the normally open position to its second position which is against the member 98 of the center pole member thereby closing the openings 86 and preventing fluid from flowing through the opening 22 and out the openings 24 of FIG. 1. Under these circumstances, total damping is accomplished by the flow of the hydraulic fluid from one side to the other of the piston 16 through the openings 25 and 27 as above described. Under these circumstances a much firmer shock absorber is provided when the undesired event has passed, the signal is removed from the coil 90 and the spool is returned to the position as shown in FIG. 17, which allows fluid to freely flow through the bypass openings 22, 24 as above described.

Figure 18:
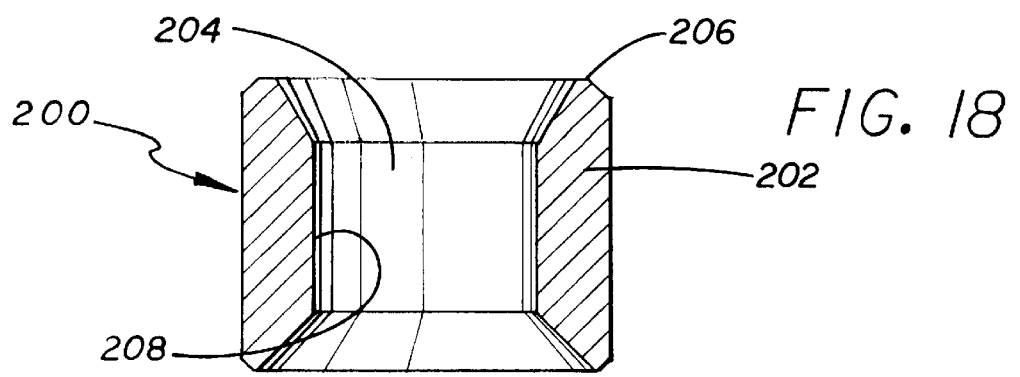
FIG. 18 is a cross-sectional view of an alternative embodiment of a retainer.
Figure 19:
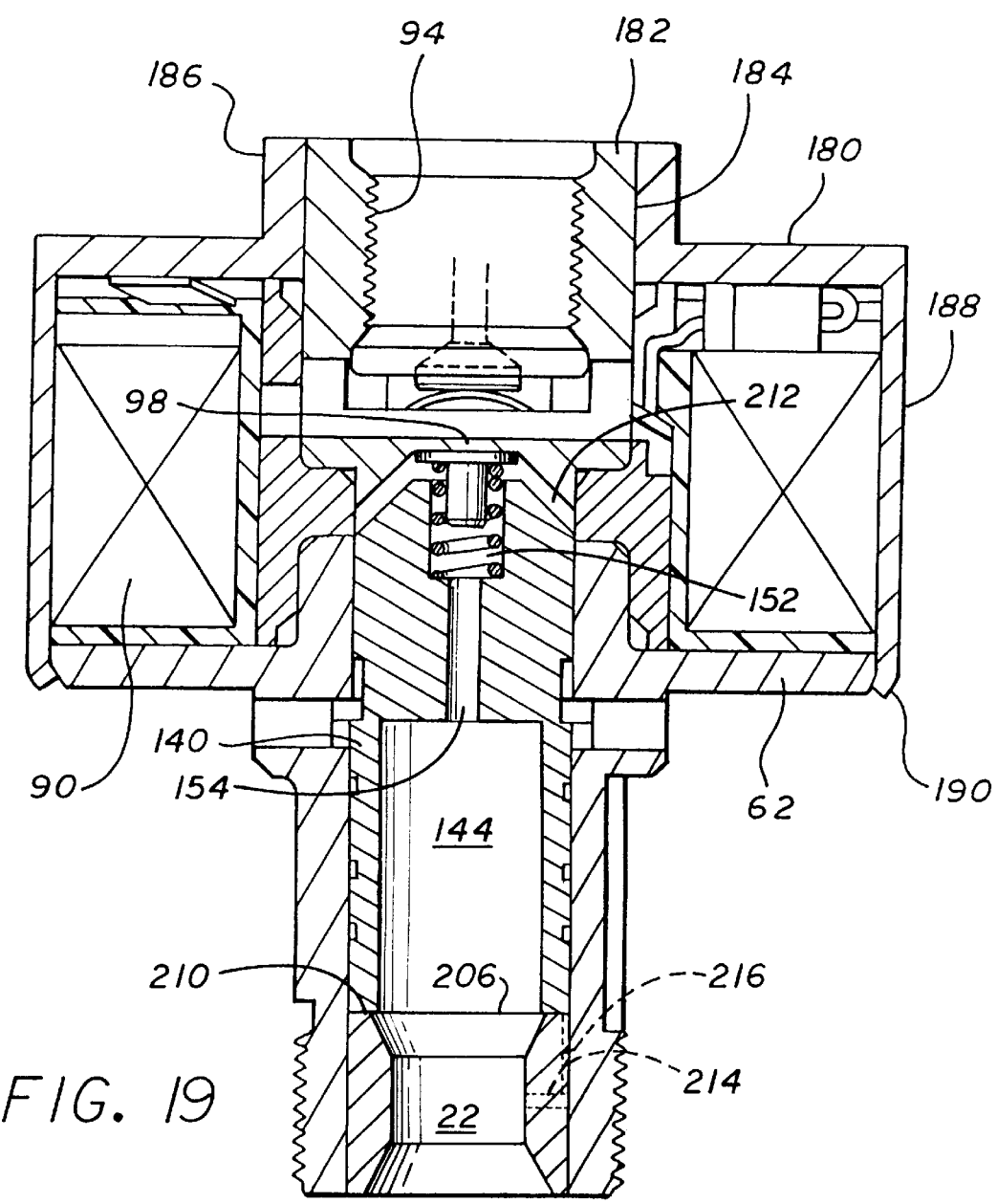
FIG. 19 is a cross-sectional view of an assembled damper valve using the retainer of FIG. 18.

Referring now more particularly to FIGS. 18 and 19, there is illustrated an alternative embodiment of a retainer and of a damper valve with the retainer as shown in FIG. 18 incorporated therein. The completed and assembled valve as is shown in FIG. 19 is similar in construction to that shown in FIG. 17 and above described and such is illustrated by the utilization of the same reference numerals for the same or similar parts.

As is illustrated in FIG. 18, the retainer 200 includes a body 202 defining an orifice 204 therethrough. The body 202 defines an upper surface 206 which is adapted to engage the lower periphery of the skirt of the spool. The outer diameter of the retainer 200 is substantially identical to the inner diameter 72 of the housing as above described. The inner surface 208 of the retainer 200 defines a restricted orifice through which fluid flows by way of the inlet 22. The inner diameter of the surface 208 is greater than the inner diameter of the bore 144 defined by the spool 140. It will be recognized that the spool illustrated in FIG. 19 is the spool illustrated as an alternative embodiment in FIG. 14.

Fluid flowing through the restricted orifice 22 upon expanding as it passes into the bore 144 generates a reduced pressure about the upper periphery 206 of the retainer 200. This reduced pressure is also applied to the lower end 210 of the spool 140. This reduced pressure zone creates a differential pressure across the spool 140 tending to urge it downwardly as viewed in FIG. 19 to retain it in the normally open position (as illustrated) in the absence of application of an electromagnetic signal to the coil 90.

The differential pressure is created because the fluid flowing through the opening 22 and through the counter bore 154 and bore 152 of the spool is trapped within a space 212 generated by having the upper surface of the spool positioned slightly below the cap 98. Thus, the fluid appearing in the space 212 has the same ambient pressure as does the fluid appearing in the bore 144 and such pressure is higher than is the pressure in the reduced pressure zone about the periphery 206 of the retainer 22. Thus, this differential pressure along with the force created by the spring 156 maintains the spool 140 in the position shown as FIG. 19 until there is applied to the coil 90 an appropriate electromagnetic energization signal. When such is applied the spool then moves upwardly as viewed in FIG. 19 and blocks the outlet openings 24 to preclude flow of fluid through the damper valve.

It should also be recognized that this differential pressure is generated and functions with the result above described irrespective of the direction of flow of fluid through the valve—that is if fluid flow is in through the openings 24 and out through the opening 22, which would be the case if the piston 16 is moving upwardly as viewed in FIG. 1, the pressure at the lower end 210 of the spool is less than the pressure at the space 212 of the valve. Thus this differential pressure urges the spool downwardly as viewed in FIG. 19 in the absence of an electromagnetic energization signal.

Although the reduced diameter orifice 204 is illustrated as being defined by a separate retainer member 200 it should be understood that the retainer and orifice may be formed as an integral port of the housing as viewed in FIG. 7. Under these circumstances the spool would be loaded from the top of the housing.

It should further be understood that the zone of differential pressure may also be generated at the area 206 drilling openings in the retainer 200 and providing flats interconnecting with the openings upwardly along the outer surface of the retainer to conduct the lower pressure existing at the smallest diameter of the retainer upwardly to the surface 206. Such is illustrated by the dashed lines 214 and 216 in FIG. 19.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A shock absorber mounted electromagnetically operated damper valve for regulating the flow of fluid through the shock absorber to accommodate varying road conditions, said damper valve comprising:

a housing having a wall defining a hollow interior having a first plurality of openings therethrough for the flow of fluid;

a spool reciprocally mounted within said hollow interior and moveable between first and second positions responsive to electromagnetic energization for controlling the flow of fluid through said hollow interior and said first plurality of openings; and a retainer received within said hollow interior for controlling the motion of said spool at one of said first and second positions and defining a reduced diameter orifice in the flow path of said fluid, said reduced diameter orifice developing a differential pressure across said spool during flow of fluid through said valve to assist in retaining said spool in a predetermined one of said first and second positions in the absence of said electromagnetic energization.

2. A shocker absorber mounted electromagnetically operated damper valve for regulating the flow of fluid through the shock absorber to accommodate varying road conditions, said damper valve comprising:

a housing having a wall defining a hollow interior having a first plurality of openings therethrough for the flow of fluid;

a spool reciprocally mounted within said hollow interior and moveable between first and second positions responsive to electromagnetic energization for controlling the flow of fluid through said hollow interior and said first plurality of openings;

a second plurality of openings defined by said spool therethrough, said second plurality of openings being aligned with selected ones of said first plurality of openings when said spool is in one of said first and second positions to provide fluid flow therethrough and when said spool is in the other of said first and said second positions fluid flow through said selected ones of said first and second plurality of openings is blocked; and a retainer received within said hollow interior for controlling the motion of said spool at one of said first and second positions and defining a reduced diameter orifice in the flow path of said fluid, said reduced diameter orifice developing a differential pressure across said spool during flow of fluid through said valve to assist in retaining said spool in a predetermined one of said first and second positions in the absence of said electromagnetic energization.

3. A valve as defined in claim 2, wherein said spool includes a body defining a bore therethrough, and a re-entrant bore terminating in a shoulder, spring means seated within said re-entrant bore on said shoulder and providing a force urging said spool toward one of said first and second positions.

4. A valve as defined in claim 3 wherein said housing further includes a cap, said spool being disposed away from said cap to provide a space between said spool and said cap to permit fluid in said hollow interior to enter said space and assist in retaining said spool in said one of said first and second positions in the absence of electromagnetic energization of said valve.

* * * * *